(12) United States Patent
Arndt et al.

(10) Patent No.: US 7,496,790 B2
(45) Date of Patent: Feb. 24, 2009

(54) METHOD, APPARATUS, AND COMPUTER PROGRAM PRODUCT FOR COORDINATING ERROR REPORTING AND RESET UTILIZING AN I/O ADAPTER THAT SUPPORTS VIRTUALIZATION

(75) Inventors: Richard Louis Arndt, Austin, TX (US); Patrick Allen Buckland, Austin, TX (US); Harvey Gene Kiel, Rochester, MN (US); Renato John Recio, Austin, TX (US); Jaya Srikrishnan, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 713 days.

(21) Appl. No.: 11/065,823

(22) Filed: Feb. 25, 2005

(65) Prior Publication Data

US 2006/0195673 A1    Aug. 31, 2006

(51) Int. Cl.
  *G06F 11/00* (2006.01)
  *G06F 11/07* (2006.01)
(52) U.S. Cl. .............. 714/24; 714/9; 714/23; 714/31
(58) Field of Classification Search ............ 714/15, 714/23, 24, 43; 710/200
  See application file for complete search history.

(56) References Cited

U.S. PATENT DOCUMENTS

| 4,674,038 | A | * | 6/1987 | Brelsford et al. ............. 714/15 |
| 5,437,033 | A | * | 7/1995 | Inoue et al. ................. 714/10 |
| 5,668,943 | A | * | 9/1997 | Attanasio et al. ............. 714/7 |
| 6,111,894 | A |   | 8/2000 | Bender et al. |
| 6,128,555 | A | * | 10/2000 | Hanson et al. ............... 701/13 |
| 6,134,641 | A |   | 10/2000 | Anand |

(Continued)

FOREIGN PATENT DOCUMENTS

EP    1508855 A2    8/2004

(Continued)

OTHER PUBLICATIONS

"Virtual Interface Architecture Specification", Version 1.0, Dec. 1997, pp. 11-12, 20-22, 55-57, 64-66, retrieved Apr. 19, 2006. http://rimonbarr.com/repository/cs614/san_10.pdf.

(Continued)

*Primary Examiner*—Scott T. Baderman
*Assistant Examiner*—Joseph Schell
(74) *Attorney, Agent, or Firm*—Duke W. Yee; Diana L. Roberts-Gerhardt; Gerald H. Glanzman

(57) ABSTRACT

A method, apparatus, and computer program product are disclosed in a shared processor data processing system for coordinating error reporting for and resetting of a physical I/O adapter that supports virtualization. The physical I/O adapter is virtualized by generating virtual I/O adapters that each represent a portion of the physical I/O adapter. Each one of the virtual I/O adapters is assigned to a different one of client logical partitions. A determination is made regarding whether the physical I/O adapter may have experienced an error. If the physical I/O adapter has experienced an error, all of the client logical partitions are notified about the error and a recovery of the physical I/O adapter is coordinated among all of the client logical partitions by waiting for each client logical partition to acknowledge the error notification before the physical I/O adapter is reset.

1 Claim, 6 Drawing Sheets

U.S. PATENT DOCUMENTS

| | | | |
|---|---|---|---|
| 6,412,078 B2 * | 6/2002 | Murotani et al. | 714/9 |
| 6,453,392 B1 | 9/2002 | Flynn, Jr. | |
| 6,487,680 B1 * | 11/2002 | Skazinski et al. | 714/23 |
| 6,629,157 B1 | 9/2003 | Falardeau et al. | |
| 6,629,162 B1 | 9/2003 | Arndt et al. | |
| 6,662,289 B1 | 12/2003 | Ang | |
| 6,665,759 B2 | 12/2003 | Dawkins et al. | |
| 6,704,284 B1 | 3/2004 | Stevenson et al. | |
| 6,766,470 B1 * | 7/2004 | Shah | 714/9 |
| 6,804,741 B2 | 10/2004 | Cowan | |
| 6,823,418 B2 | 11/2004 | Langendorf et al. | |
| 6,880,021 B2 | 4/2005 | Easton et al. | |
| 6,973,510 B2 | 12/2005 | Arndt et al. | |
| 7,080,291 B2 | 7/2006 | Moriki et al. | |
| 2001/0020282 A1 * | 9/2001 | Murotani et al. | 714/9 |
| 2002/0069335 A1 | 6/2002 | Flynn, Jr. | |
| 2002/0085493 A1 | 7/2002 | Pekkala et al. | |
| 2002/0112102 A1 | 8/2002 | Tarui et al. | |
| 2002/0120884 A1 * | 8/2002 | Nakamikawa et al. | 714/31 |
| 2002/0129172 A1 | 9/2002 | Baskey et al. | |
| 2002/0129212 A1 | 9/2002 | Lee et al | |
| 2003/0014738 A1 | 1/2003 | Dawkins et al. | |
| 2003/0061379 A1 | 3/2003 | Craddock et al. | |
| 2003/0110205 A1 | 6/2003 | Johnson | |
| 2003/0204648 A1 | 10/2003 | Arndt | |
| 2003/0236852 A1 | 12/2003 | Fernandes et al. | |
| 2004/0202189 A1 * | 10/2004 | Arndt et al. | 370/409 |
| 2005/0076157 A1 | 4/2005 | Serizawa et al. | |
| 2005/0091365 A1 | 4/2005 | Lowell et al. | |
| 2005/0097384 A1 | 5/2005 | Uehara et al. | |
| 2005/0102682 A1 | 5/2005 | Shah et al. | |
| 2005/0119996 A1 | 6/2005 | Ohata et al. | |
| 2005/0120160 A1 | 6/2005 | Plouffe et al. | |
| 2005/0182788 A1 | 8/2005 | Arndt et al. | |
| 2005/0240932 A1 | 10/2005 | Billau et al. | |
| 2005/0246450 A1 | 11/2005 | Enko et al. | |
| 2006/0044301 A1 | 3/2006 | Ha | |
| 2006/0069828 A1 | 3/2006 | Goldsmith | |
| 2006/0112376 A1 | 5/2006 | Broberg et al. | |
| 2006/0184349 A1 | 8/2006 | Goud et al. | |
| 2006/0239287 A1 | 10/2006 | Johnsen et al. | |
| 2006/0242330 A1 | 10/2006 | Torudbakken et al. | |
| 2006/0242332 A1 | 10/2006 | Johnsen et al. | |
| 2006/0242333 A1 | 10/2006 | Johnsen et al. | |
| 2006/0242352 A1 | 10/2006 | Torudbakken et al. | |
| 2006/0242354 A1 | 10/2006 | Johnsen et al. | |
| 2006/0253619 A1 | 11/2006 | Torudbakken et al. | |

OTHER PUBLICATIONS

Jann et al., "Dynamic Reconfiguration: Basic Building Blocks for Autonomic Computing on IBM PSeries Servers," IBM System Journal, vol. 42, Jan. 2003 pp. 29-37.

"Logical Partition Security in the IBM @server pSeries 690", IBM, 2002, pp. 1-13.

Hensbergen, "The Effect of Virtualization on OS Interference", IBM Research, Proceedings of 1st workshop on Operating Systems Inteference in High Performance Applications, Aug. 2005, p. 1-6.

* cited by examiner

METHOD, APPARATUS, AND COMPUTER PROGRAM PRODUCT FOR COORDINATING ERROR REPORTING AND RESET UTILIZING AN I/O ADAPTER THAT SUPPORTS VIRTUALIZATION

CROSS-REFERENCE TO RELATED APPLICATIONS

This application is related to commonly assigned and U.S. patent application Ser. No. 11/066,424 entitled "Method, System and Program Product for Differentiating Between Virtual Hosts on Bus Transactions and Associating Allowable Memory Access for an Input/Output Adapter that Supports Virtualization"; U.S. patent application Ser. No. 11/066,645 entitled "Virtualized I/O Adapter for a Multi-Processor Data Processing System"; U.S. patent application Ser. No. 11/065,869 entitled "Virtualized Fibre Channel Adapter for a Multi-Processor Data Processing System"; U.S. patent application Ser. No. 11/065,951 entitled "Interrupt Mechanism on an IO Adapter That Supports Virtualization"; U.S. patent application Ser. No. 11/066,201 entitled "System and Method for Modification of Virtual Adapter Resources in a Logically Partitioned Data Processing System"; U.S. patent application Ser. No. 11/065,818 entitled "Method, System, and Computer Program Product for Virtual Adapter Destruction on a Physical Adapter that Supports Virtual Adapters"; U.S. patent application Ser. No. 11/066,518 entitled "System and Method of Virtual Resource Modification on a Physical Adapter that Supports Virtual Resources"; U.S. patent application Ser. No. 11/066,096 entitled "System and Method for Destroying Virtual Resources in a Logically Partitioned Data Processing System"; U.S. patent application Ser. No. 11/066,419 entitled "Association of Memory Access Through Protection Attributes that are Associated to an Access Control Level on a PCI Adapter that Supports Virtualization"; U.S. patent application Ser. No. 11/066,931 entitled "Association of Host Translations that are Associated to an Access Control Level on a PCI Bridge that Supports Virtualization"; U.S. patent application Ser. No. 11/068,664 entitled "Method and System for Fully Trusted Adapter Validation of Addresses Referenced in a Virtual Host Transfer Request"; U.S. patent application Ser. No. 11/066,353 entitled "System, Method, and Computer Program Product for a Fully Trusted Adapter Validation of Incoming Memory Mapped I/O Operations on a Physical Adapter that Supports Virtual Adapters or Virtual Resources"; U.S. patent application Ser. No. 11/065,830 entitled "System and Method for Host Initialization for an Adapter that Supports Virtualization"; U.S. patent application Ser. No. 11/065,829 entitled "Data Processing System, Method, and Computer Program Product for Creation and Initialization of a Virtual Adapter on a Physical Adapter that Supports Virtual Adapter Level Virtualization"; U.S. patent application Ser. No. 11/066,517 entitled "System and Method for Virtual Resource Initialization on a Physical Adapter that Supports Virtual Resources"; U.S. patent application Ser. No. 11/065,821 entitled "Method and System for Native Virtualization on a Partially Trusted Adapter Using Adapter Bus, Device and Function Number for Identification"; U.S. patent application Ser. No. 11/066,487 entitled "Native Virtualization on a Partially Trusted Adapter Using PCI Host Memory Mapped Input/Output Memory Address for Identification"; U.S. patent application Ser. No. 11/066,519 entitled "Native Virtualization on a Partially Trusted Adapter Using PCI Host Bus, Device, and Function Number for Identification; U.S. patent application Ser. No. 11/066,521 entitled "System and Method for Virtual Adapter Resource Allocation"; U.S. patent application Ser. No. 11/067,354 entitled "System and Method for Providing Quality of Service in a Virtual Adapter"; and U.S. patent application Ser. No. 11/066,590 entitled "System and Method for Managing Metrics Table Per Virtual Port in a Logically Partitioned Data Processing System" all of which are hereby incorporated by reference.

BACKGROUND OF THE INVENTION

1. Technical Field

The present invention is directed to data processing systems. More specifically, the present invention is directed to a method, apparatus, and computer program product for coordinating error reporting and reset in an I/O adapter that supports virtualization.

2. Description of Related Art

Large symmetric multi-processor data processing systems, such as IBM eServer P690, available from International Business Machines Corporation, DHP9000 Superdome Enterprise Server, available from Hewlett-Packard Company, and the Sunfire 15K server, available from Sun Microsystems, Inc. may be partitioned and used as multiple smaller systems. These systems are often referred to as logically partitioned (LPAR) data processing systems. A logical partition functionality within a data processing system allows multiple copies of a single operating system or multiple heterogeneous operating systems to be simultaneously run on a single data processing system platform. A partition, within which an operating system image runs, is assigned a non-overlapping subset of the platform's physical resources. These platform allocable resources include one or more architecturally distinct processors with their interrupt management area, regions of system memory, and input/output (I/O) adapter bus slots. The partition's resources are represented by the platform's firmware to the operating system image.

Each distinct operating system or image of an operating system running within a platform is protected from each other such that software errors on one logical partition cannot affect the correct operation of any of the other partitions. This protection is provided by allocating a disjointed set of platform resources to be directly managed by each operating system image and by providing mechanisms for insuring that the various images cannot control any resources that have not been allocated to that image. Furthermore, software errors in the control of an operating system's allocated resources are prevented from affecting the resources of any other image. Thus, each image of the operating system or each different operating system directly controls a distinct set of allocable resources within the platform.

With respect to hardware resources in a logically partitioned data processing system, these resources are disjointly shared among various partitions. These resources may include, for example, input/output (I/O) adapters, memory modules, non-volatile random access memory (NVRAM), and hard disk drives. Each partition within an LPAR data processing system may be booted and shut down over and over without having to power-cycle the entire data processing system.

Some known systems include firmware, also called a hypervisor, that manages and enforces the logical partitioning of the hardware. For example, a hypervisor may receive a request from the system to dispatch a virtual processor to a physical processor. The virtual processor includes a definition of the work to be done by a physical processor as well as various settings and state information that are required to be set within the physical processor in order for the physical processor to execute the virtual processor's work.

The various hardware devices, such as physical I/O adapters, can also be virtualized and thus shared among different logical partitions. When a hardware device is virtualized, it is logically divided into subdivisions. Each subdivision is considered to be a virtual version of the entire physical device.

For example, a particular physical I/O adapter may be virtualized into many different virtual I/O adapters. Each virtual I/O adapter may be assigned to and then used by a different logical partition. Each virtual I/O adapter is presented to a logical partition as if that virtual I/O adapter were the entire physical I/O adapter. In this manner, the virtual device is a logical substitute for the corresponding physical device.

Each logical partition will include its own device driver that is responsible for controlling its particular virtual I/O adapter. When a physical I/O adapter experiences a hardware error, the state of the physical I/O adapter may be different from the state that is expected by the device drivers that access a virtual I/O adapter that represents this particular physical I/O adapter. This difference between the state of the physical I/O adapter and its virtual I/O adapters could be propagated throughout the system resulting in errors in the system. Therefore, the hardware platform must prevent the propagation of errors that arise from this difference in the state of the virtual I/O adapters and their underlying physical I/O adapter.

One method for preventing the propagation of such errors is to "machine check", also called "check-stop" each partition that uses a virtual I/O adapter that is based on this physical I/O adapter. The problem with this method is that the machine check occurs in a logical partition, the machine check terminates processing in that partition which usually causes a loss of all in-flight data when the machine check occurs.

Another method is for the I/O bus interface to initiate a 37 freeze mode". When an I/O bus interface is in freeze mode, all physical I/O adapters that are coupled to that I/O bus interface are also in freeze mode. Any stores to a physical I/O adapter that is in freeze mode are discarded. Any loads from a physical I/O adapter that is in freeze mode will result in the return of a special code that indicates freeze mode instead of the expected data. Thus, if a device driver requests data from a virtual I/O adapter that represents a particular physical I/O adapter that is in freeze mode, the special code is returned to the device driver instead of data. This special code may be any predetermined value but is typically a bit combination of all logical ones.

Eventually, one or more device drivers will request a load from their virtual I/O adapter that is based on the physical I/O adapter that is in freeze mode, receive the special code, and then suspect that the physical I/O adapter is in freeze mode. A problem arises, however, because at this time not all of the partitions necessarily suspect that the underlying physical I/O adapter is in freeze mode. In fact, some of the partitions may suspect the underlying physical I/O adapter is in freeze mode while others may be actively attempting to store data to their virtual I/O adapters and thus to that physical I/O adapter.

The prior art provides no method for the device drivers that use virtual I/O adapters that are based on an underlying physical I/O adapter that is in freeze mode to coordinate a recovery from the freeze mode state across logical partition boundaries. Coordination problems may arise because not all of the partitions know about the freeze mode condition or because one of the partitions may not properly execute its role in the recovery process.

Therefore, a need exists for a method, apparatus, and computer program product for coordinating error reporting and reset in an I/O adapter that supports virtualization.

SUMMARY OF THE INVENTION

A method, apparatus, and computer program product are disclosed in a shared processor logically partitioned data processing system for coordinating error reporting for and resetting of a physical I/O adapter that supports virtualization. The physical I/O adapter is virtualized by generating virtual I/O adapters that each represent a portion of the physical I/O adapter. Each one of the virtual I/O adapters is assigned to a different one of client logical partitions. A determination is made regarding whether the physical I/O adapter may have experienced an error. If the physical I/O adapter has experienced an error, all of the client logical partitions are notified about the error and a recovery of the physical I/O adapter is coordinated among all of the client logical partitions by waiting for each client logical partition to acknowledge the error notification before the physical I/O adapter is reset.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
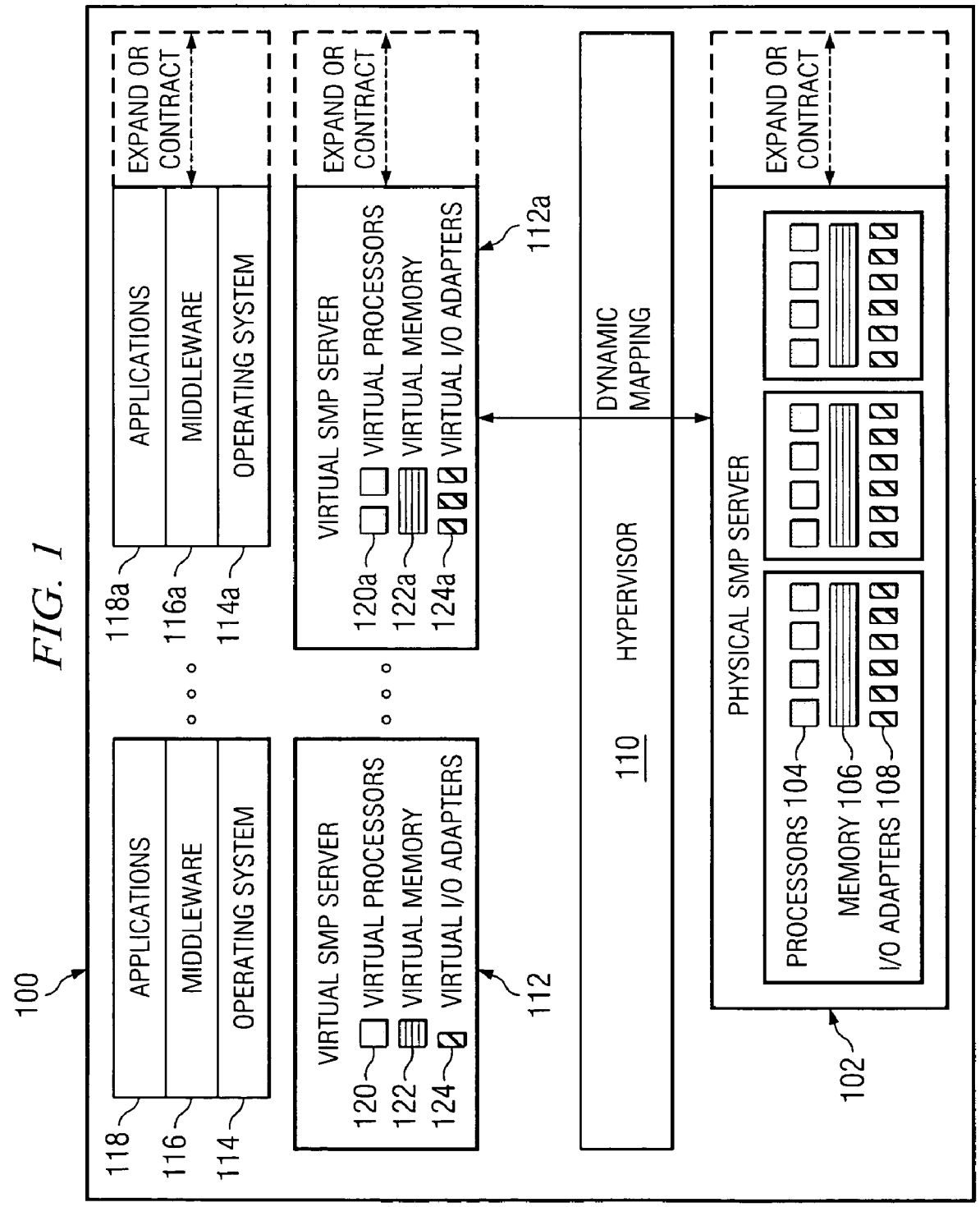
FIG. 1 is a block diagram of a data processing system which includes the present invention.

A preferred embodiment of the present invention and its advantages are better understood by referring to the figures, like numerals being used for like and corresponding parts of the accompanying figures.

The present invention is a method, apparatus, and computer program product in a shared processor data processing system for coordinating error reporting for and resetting of a physical I/O adapter that supports virtualization. The shared processor data processing system includes a plurality of logical partitions. Hardware devices, such as physical I/O adapters, are partitioned by being assigned to one of these logical partitions. The logical partition to which a physical I/O adapter is assigned is said to "own" its partitioned devices.

The data processing system permits a logical partition to subdivide its owned devices and assign part of the device to other logical partitions. The owning logical partition is called the master partition. The other logical partitions that share a hardware device that is owned by the master partition are called client logical partitions. The physical I/O adapter is virtualized by the master partition by generating virtual I/O adapters that represents a portion of the physical I/O adapter. Each one of the virtual I/O adapters is assigned to a different one of client logical partitions.

A virtual adapter usually has all of the function of a standard physical I/O adapter that is designed to be used by a single operating system. Such an adapter provides one interface to the processor. However, the physical I/O adapters described herein present multiple interfaces to the processors. Most of these interfaces look just like the interface of a standard physical I/O adapter. In addition, there is at least one interface that manages the adapter configuration, i.e. assignment of each of the other interfaces to a using partition, plus I/O adapter wide error recovery. Each such "standard" interface presented by this physical I/O adapter is considered to be a different virtual I/O adapter. Each virtual I/O adapter has only the functionality of a single standard I/O adapter and does not have the functionality of the management interface.

A determination is made regarding whether the physical I/O adapter may have experienced an error. If the physical I/O adapter has experienced an error, the master partition notifies all of the client logical partitions about the error. The master partition then waits until either all of the client partitions have acknowledged the notification or a maximum response time has expired before attempting to reset the physical I/O adapter. Once the master partition either receives an acknowledgement from all of the client partitions or a maximum response time for responses has expired, the master partition will attempt to reset the physical I/O adapter. Once the master partition has successfully reset the physical I/O adapter, the master partition will notify each client partition about the successful reset. Then, each client partition will reinitialize its virtual I/O adapter. This is the virtual I/O adapter that is based on the physical I/O adapter. In this manner, reset and recovery of the physical I/O adapter and the corresponding virtual I/O adapters supported by that physical I/O adapter are coordinated among all of the client logical partitions.

FIG. 1 is a block diagram of a data processing system 100, including a hypervisor, upon which the present invention may be implemented. System 100 is preferably a symmetric multiprocessing (SMP) server computer system. SMP server computer system 100 includes physical hardware devices that can be mapped to, i.e. temporarily owned by, a user application to execute that application.

SMP server computer system 100 includes a physical SMP server 102. Physical SMP server 102 includes physical hardware devices such as processors 104, memory 106, and I/O adapters 108. These physical devices are managed by hypervisor 110. Each one of the processors 104 is preferably a simultaneous multithreaded (SMT) processor that is capable of concurrently executing multiple different threads on the processor.

A virtual server is a proxy for a physical server that has similar capabilities, interfaces, and state. Virtual servers are created and managed by a hypervisor that resides on physical SMP server computer system 100. A virtual server appears to be a physical SMP server to its user: the operating system, middleware, and application software that run upon it. SMP server computer system 100 includes one or more virtual servers such as virtual server 112 and virtual server 112*a*.

Each virtual server appears to its software to include its own processor(s), memory, and I/O adapter(s) that are available for the exclusive use of that virtual server. For example, virtual server 112 includes a virtual processor 120, virtual memory 122, and virtual I/O adapters 124. Virtual server 112*a* includes virtual processors 120*a*, virtual memory 122*a*, and virtual I/O adapters 124*a*.

Each virtual server supports its own software environment, including an operating system, middleware, and applications. The software environment of each virtual server can be different from the software environment of other virtual servers. For example, the operating systems executed by each virtual server may differ from one another.

For example, virtual server 112 supports operating system 114, middleware 116, and applications 118. Virtual server 112*a* supports operating system 114*a*, middleware 116*a*, and applications 118*a*. Operating systems 114 and 114*a* may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 110 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 104, is selected by hypervisor 110 to be used to execute and implement that virtual processor. Hypervisor 110 manages the selections of physical devices and their temporary assignment to virtual devices.

Hypervisor 110 is responsible for dynamically creating, managing, and destroying virtual SMP servers. Whole virtual processors, virtual I/O adapters, and virtual memory blocks can be removed or added by hypervisor 110. Hypervisor 110 is also responsible for dynamic resource allocation, managing time-sharing of physical resources, and altering the physical resource mapped to a processor without involving the operating system. Hypervisor 110 is also able to dedicate physical resources to virtual resources for situations where sharing is not desired. Hypervisor 110 is responsible for managing the addition or removal of physical resources. Hypervisor 110 makes these additions and deletions transparent to the upper level applications.

Figure 2:
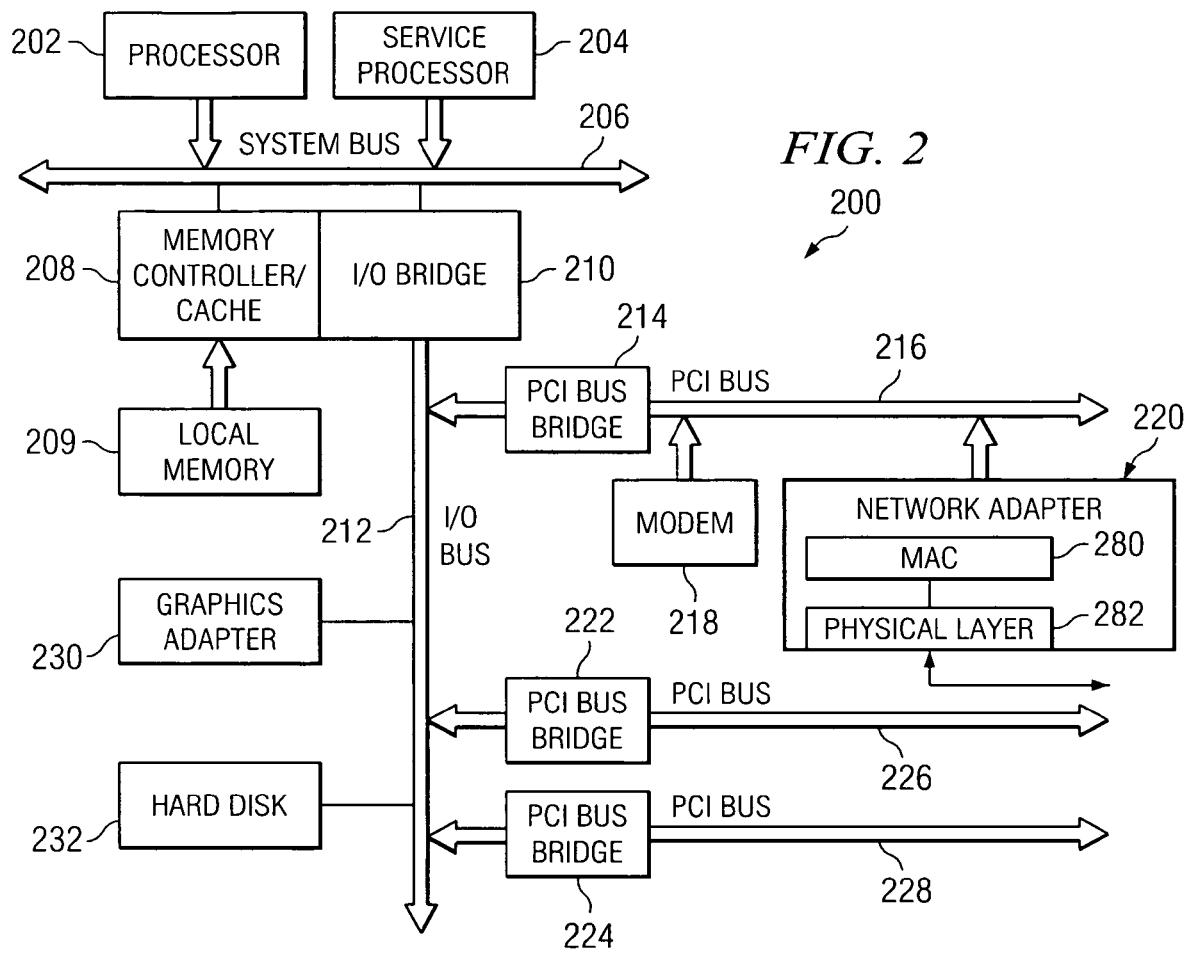
FIG. 2 is a more detailed illustration of a computer system that may be used to implement any of the computer systems described herein in which the present invention may be implemented in accordance with the present invention.

FIG. 2 is a more detailed illustration of a computer system that may be used to implement any of the computer systems described herein in which the present invention may be implemented in accordance with the present invention. Data processing system 200 may be a symmetric multiprocessor (SMP) system including a plurality of SMT-capable processors 202 and 204 connected to system bus 206. Alternatively, a single processor system may be employed. In the depicted example, processor 204 is a service processor. All of the processors described herein with reference to all of the figures are SMT-capable processors. Each SMT-capable processor is capable of concurrently executing multiple threads on the one processor.

Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Network adapter 220 includes a physical layer 282 which conditions analog signals to go out to the network, such as for example an Ethernet network over an R45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Service processor 204 interrogates system processors, memory components, and I/O bridges to generate an inventory and topology understanding of data processing system 200. Service processor 204 also executes Built-In-Self-Tests (BISTs), Basic Assurance Tests (BATs), and memory tests on all elements found by interrogating a system processor, memory controller, and I/O bridge. Any error information for failures detected during the BISTs, BATS, and memory tests are gathered and reported by service processor 204.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The present invention may be executed by one of the computers depicted by FIG. 1 or 2.

Figure 3:
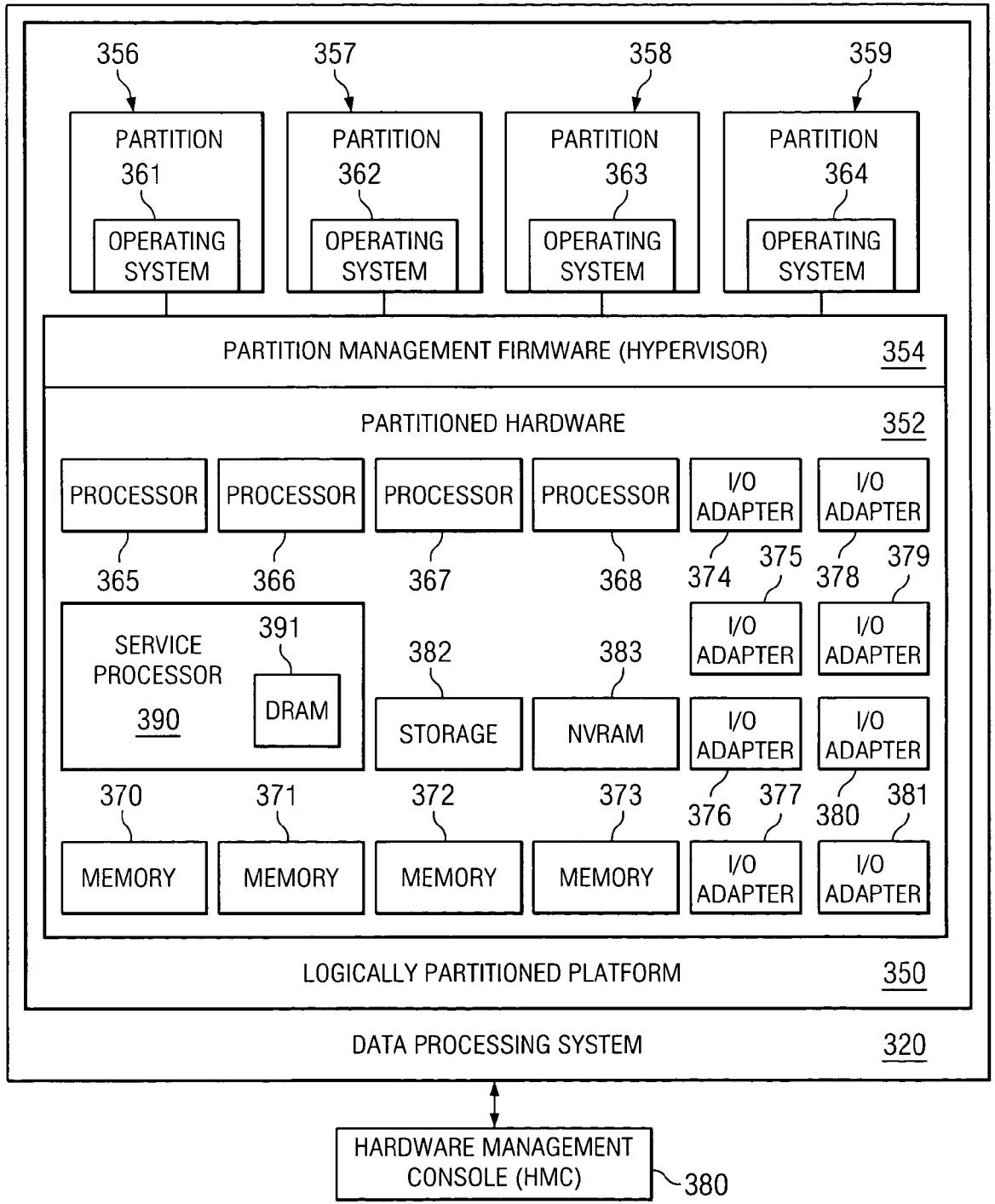
FIG. 3 is a block diagram of a logically partitioned platform that includes the present invention.

FIG. 3 is a block diagram of a logically partitioned platform that includes the present invention. Data processing system 320 includes logically partitioned platform 350. Platform 350 includes partitioned hardware 352, partition management firmware, also called a hypervisor 354, and partitions 356-359. Operating systems 361-364 exist within partitions 356-359. Operating systems 361-364 may be multiple copies of a single operating system or multiple heterogeneous operating systems simultaneously run on platform 350.

Partitioned hardware 352 includes a plurality of SMT-capable processors 365-368, a plurality of system memory units 370-373, a plurality of input/output (I/O) adapters 374-381, and a storage unit 382. Each of the processors 365-368, memory units 370-373, NVRAM storage 383, and I/O adapters 374-381 may be assigned to one of multiple partitions 356-359. Partitioned hardware 352 also includes service processor 390. A non-volatile memory device 391, such as an NVRAM device, is included within service processor 390.

Partition management firmware (hypervisor) 354 performs a number of functions and services for partitions 356-359 to create and enforce the partitioning of logically partitioned platform 350. Hypervisor 354 is a firmware implemented virtual machine identical to the underlying hardware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 354 allows the simultaneous execution of independent OS images 361-364 by virtualizing all the hardware resources of logically partitioned platform 250. Hypervisor 354 may attach I/O devices through I/O adapters 374-381 to single virtual machines in an exclusive mode for use by one of OS images 361-364.

A hardware management console (HMC) 380 may be coupled to service processor 390 in data processing system 320. HMC 380 is a separate computer system that is coupled to service processor 390 and may be used by a user to control various functions of system 320 through service processor 390.

Figure 4:
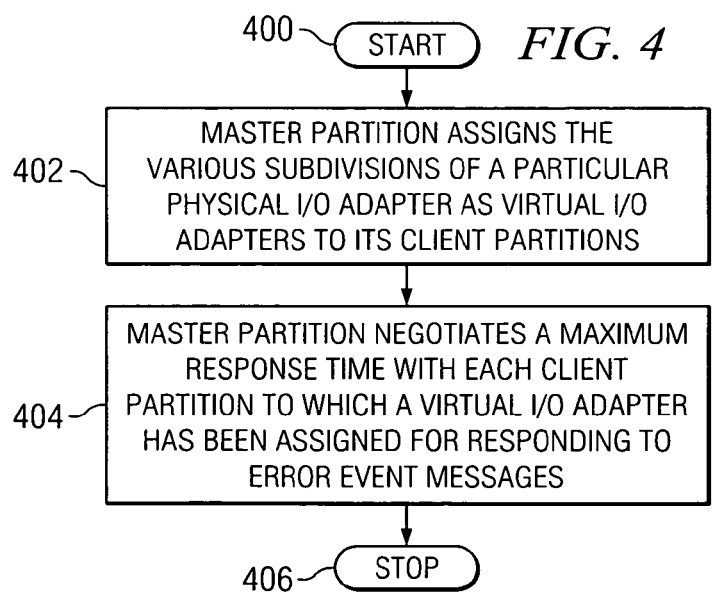
FIG. 4 depicts a high level flow chart that illustrates a master partition virtualizing one of its physical I/O adapters in accordance with the present invention.

FIG. 4 depicts a high level flow chart that illustrates a master partition virtualizing one of its physical I/O adapters in accordance with the present invention. The process starts as depicted by block 400. The master partition subdivides a physical I/O adapter. Each subdivision is considered to be a different virtual I/O adapter. Each virtual I/O adapter can be assigned to a different logical partition. Each logical partition will include a device driver that is responsible for accessing its assigned virtual I/O adapter. Next, block 402 illustrates the master partition assigning the various subdivisions of a particular physical I/O adapter as virtual I/O adapters to its client partitions. The process then passes to block 404 which depicts the master partition negotiating a maximum response time with each client partition to which a virtual I/O adapter has been assigned for responding to error event messages. The process then terminates as illustrated by block 406.

Figure 5:
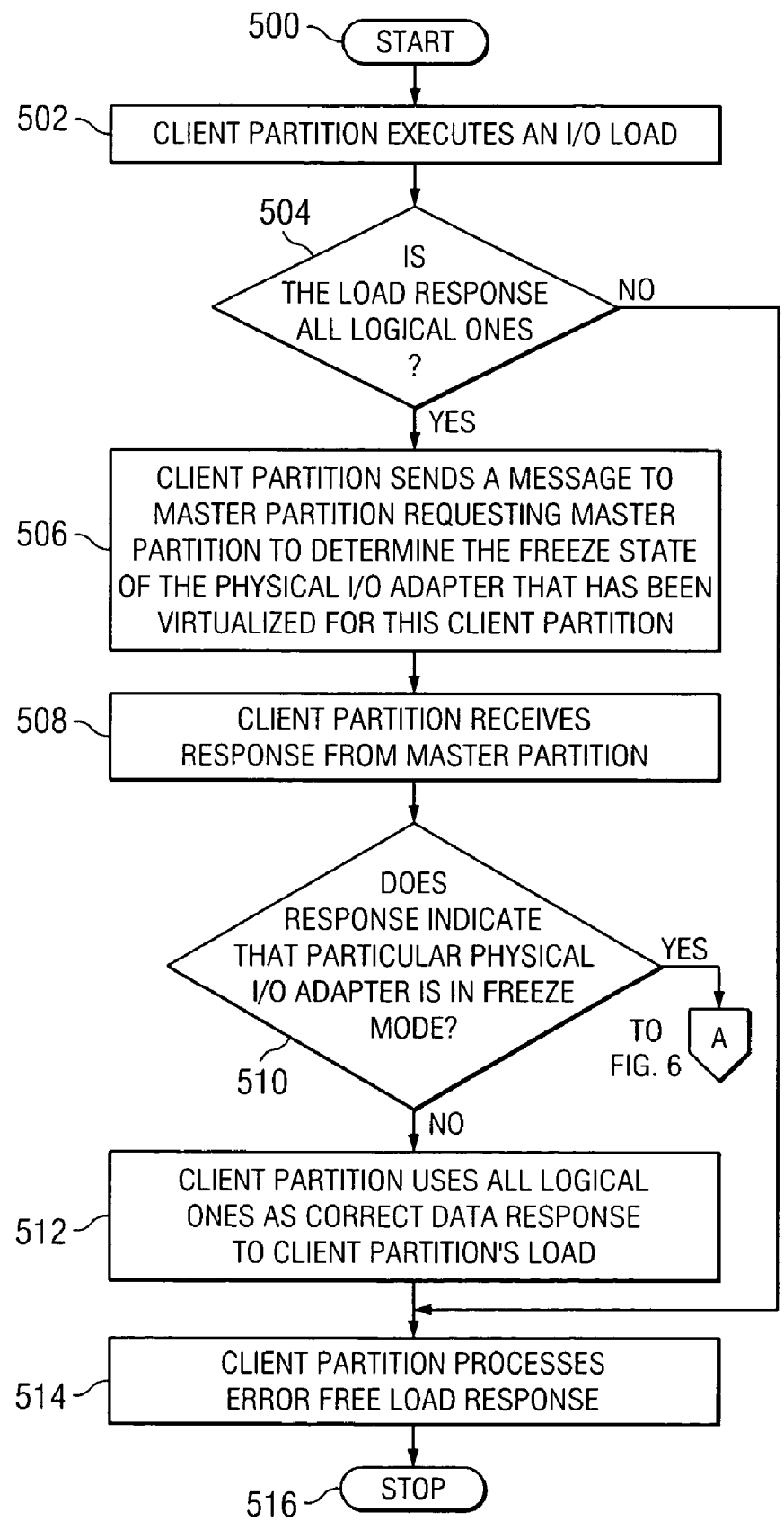
FIG. 5 illustrates a high level flow chart that depicts a client logical partition notifying a master logical partition that the physical I/O adapter on which the client's virtual I/O adapter is based may be in freeze mode in accordance with the present invention.

FIG. 5 illustrates a high level flow chart that depicts a client logical partition notifying a master logical partition that the physical I/O adapter on which the client's virtual I/O adapter is based may be in freeze mode in accordance with the present invention. The process starts as depicted by block 500 and thereafter passes to block 502 which illustrates the client partition executing an I/O load. Next, block 504 depicts a determination of whether or not the load response is all logical ones. If a determination is made that the load response is not all logical ones, the process passes to block 514.

Referring again to block 504, if a determination is made that the load response is all logical ones, the process passes to block 506 which illustrates the client partition sending a message to the master partition requesting the master partition to determine the freeze state of the physical I/O adapter that has been virtualized for this client partition.

The process then passes to block 508 which depicts the client partition receiving a response from the master partition. Next, block 510 illustrates a determination of whether or not the response indicates that the particular physical I/O adapter is in freeze mode. If a determination is made that the response indicates that the particular physical I/O adapter is in freeze mode, the process passes to block 608 in FIG. 6.

Referring again to block 510 in FIG. 5, if a determination is made that the response indicates that the particular physical I/O adapter is not in freeze mode, the process passes to block 512 which depicts the client partition using all logical ones as the correct data response to the client partition's load request. The process then passes to block 514.

Block 514 illustrates the client partition processing the error free load response. The process then terminates as depicted by block 516.

Figure 6:
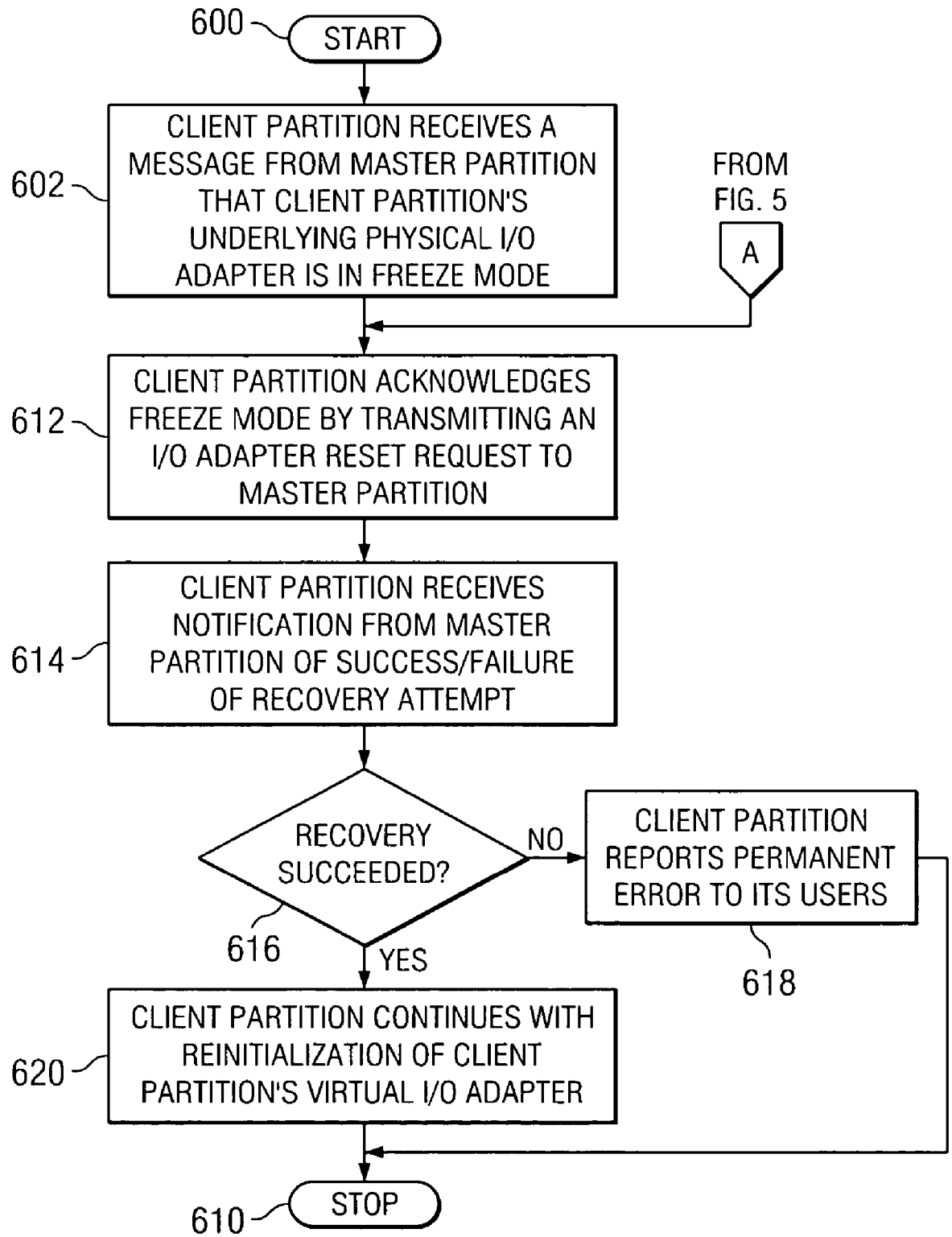
FIG. 6 depicts a high level flow chart that illustrates a client logical partition acknowledging its receipt of a notification that the physical I/O adapter on which its virtual I/O adapter is based is in freeze mode in accordance with the present invention.

FIG. 6 illustrates a high level flow chart that illustrates a client logical partition acknowledging its receipt of a notification that the physical I/O adapter on which its virtual I/O adapter is based is in freeze mode in accordance with the present invention. The process starts as depicted by block 600 and thereafter passes to block 602 which illustrates the client partition receiving a message from the master partition that the client partition's underlying physical I/O adapter is in freeze mode. Next, block 612 illustrates the client partition acknowledging the freeze mode by transmitting an I/O adapter reset request to the master partition.

The process then passes to block 614 which depicts the client partition receiving notification from the master partition of success or failure of the recovery attempt. Thereafter, block 616 illustrates a determination of whether or not the recovery succeeded. If a determination is made that the recovery succeeded, the process passes to block 618 which depicts the client partition reporting a permanent error to its users. The process then terminates as illustrated by block 610.

Referring again to block 616, if a determination is made that the recovery succeeded, the process passes to block 620 which illustrates the client partition continues with re-initialization of the client partition's virtual I/O adapter. The process then terminates as illustrated by block 610.

Figure 7:
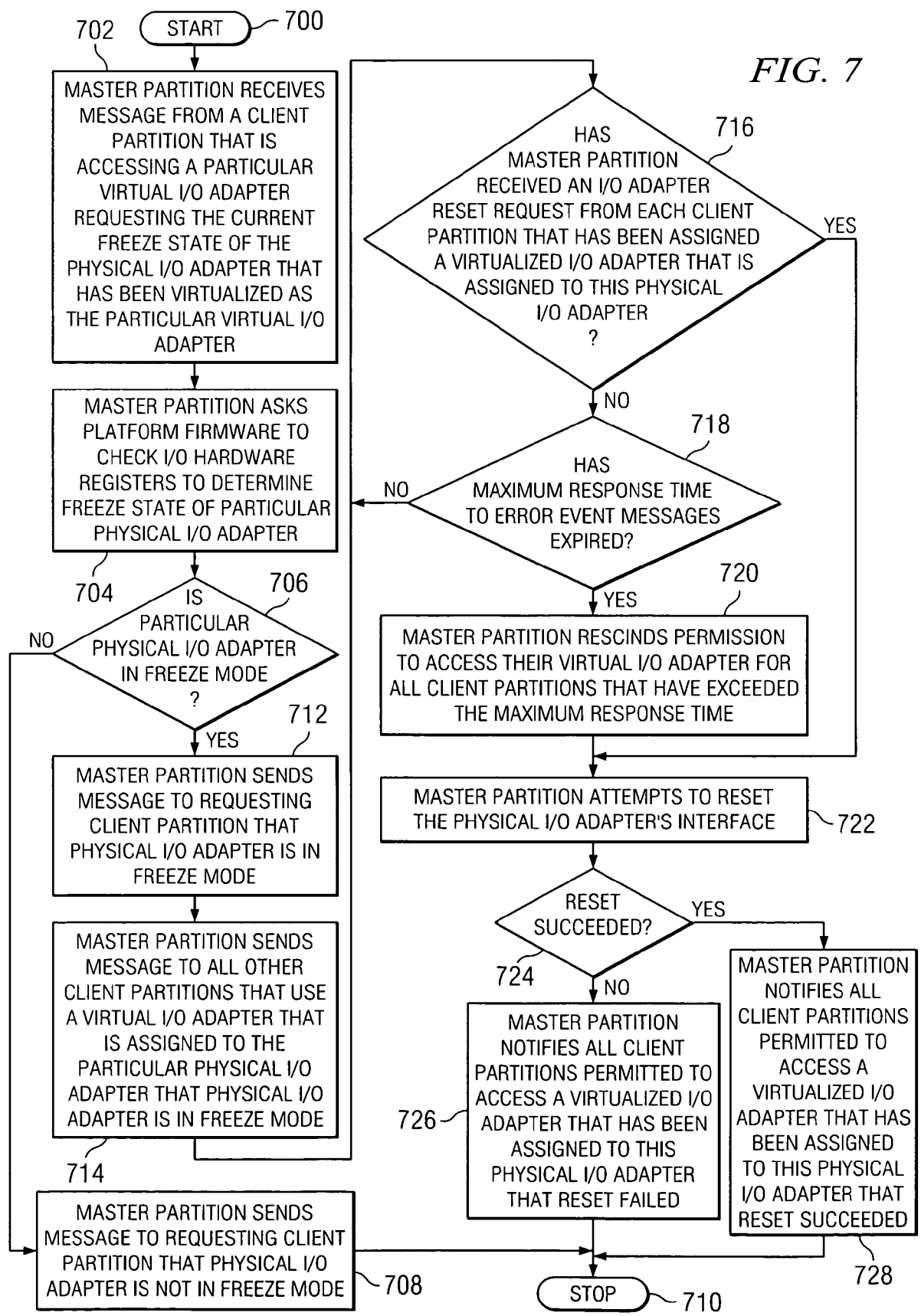
FIG. 7 illustrates a high level flow chart that depicts a master logical partition coordinating the resetting of a physical I/O adapter by waiting until all client logical partitions have acknowledged receipt of a notification that the physical I/O adapter is in freeze mode in accordance with the present invention.

FIG. 7 illustrates a high level flow chart that depicts a master logical partition coordinating the resetting of a physical I/O adapter by waiting until all client logical partitions have acknowledged receipt of a notification that the physical I/O adapter is in freeze mode in accordance with the present invention. The process starts as depicted by block 700 and thereafter passes to block 702 which illustrates the master partition receiving a message from a client partition that is accessing a particular virtual I/O adapter requesting the current freeze state of the physical I/O adapter that has been virtualized as the particular virtual I/O adapter. The process then passes to block 704 which depicts the master partition asking the platform firmware to check the I/O hardware registers to determine the freeze state of the particular physical I/O adapter.

Next, block 706 illustrates a determination of whether or not the particular physical I/O adapter is in freeze mode. If a determination is made that the particular physical I/O adapter is not in freeze mode, the process passes to block 708 which depicts the master partition sending a message to the requesting client partition that the physical I/O adapter is not in freeze mode. The process then terminates as illustrated by block 710.

Referring again to block 706, if a determination is made that the particular physical I/O adapter is in freeze mode, the process passes to block 712 which illustrates the master partition sending a message to requesting the client partition that physical I/O adapter is in freeze mode. Next, block 714 depicts the master partition sending a message to all other client partitions that use a virtual I/O adapter that is assigned to the particular physical I/O adapter that the physical I/O adapter is in freeze mode.

The process then passes to block 716 which illustrates a determination of whether or not the master partition received an I/O adapter reset request from each client partition that has been assigned a virtualized I/O adapter that is assigned to this physical I/O adapter. If a determination is made that the master partition has not received an I/O adapter reset request from each client partition that has been assigned a virtualized I/O adapter that is assigned to this physical I/O adapter, the process passes to block 718 which depicts a determination of whether or not the maximum response time to the error event message has expired. If a determination is made that the maximum response time to the error event message has not expired, the process passes back to block 716. Referring again to block 718, if a determination is made that the maximum response time to the error event message has expired, the process passes to block 720 which depicts the master partition rescinding the permission to access their virtual I/O adapter for all client partitions that have exceeded the maximum response time. The process then passes to block 722. Referring again to block 716, if a determination is made that the master partition has received an I/O adapter reset request from each client partition that has been assigned a virtualized I/O adapter that is assigned to this physical I/O adapter, the process passes to block 722.

Block 722, then, illustrates the master partition attempts to reset the physical I/O adapter's interface. Next, block 724 depicts a determination of whether or not the reset has succeeded. If a determination is made that the reset did not succeed, the process passes to block 726 which illustrates the master partition notifying all client partitions that are permitted to access a virtualized I/O adapter that has been assigned to this physical I/O adapter that the reset failed. The process then terminates as depicted by block 710. Referring again to block 724, if a determination is made that the reset did succeed, the process passes to block 728 which illustrates the master partition notifying all client partitions that are permitted to access a virtualized I/O adapter that has been assigned to this physical I/O adapter that the reset succeeded. The process then terminates as depicted by block 710.

It is important to note that while the present invention has been described in the context of a fully functioning data processing system. Those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a shared processor data processing system for coordinating error reporting for and resetting of a physical input/output adapter that supports virtualization, said method comprising:

specifying a master partition that owns said physical input/output adapter;

virtualizing, by said master partition, said physical input/output adapter by generating a plurality of virtual input/output adapters that each represent a portion of said physical input/output adapter;

assigning, by said master partition, each one of said plurality of virtual input/output adapters to a different one of a plurality of client logical partitions, wherein each of said plurality of client logical partitions includes a device driver for accessing its assigned virtual input/output adapter;

reporting to said master partition, by one of said plurality of client logical partitions, that said physical input/output adapter may have experienced an error;

determining, by said master partition, whether said physical input/output adapter experienced an error, wherein determining whether said physical input/output adapter experienced an error comprises said master partition asking platform firmware to check hardware registers to determine whether said physical input/output adapter is in a freeze state, wherein said physical input/output adapter enters a freeze state when said physical input/output adapter experiences an error; and in response to determining that said physical input/output adapter experienced an error, said master partition notifying each of said plurality of client logical partitions that said physical input/output adapter experienced an error, and said master partition coordinating a recovery of said physical input/output adapter among all of said plurality of client logical partitions, wherein coordinating a recovery of said physical input/output adapter among all of said plurality of client logical partitions, comprises:

negotiating between said master partition and each of said plurality of client logical partitions a maximum response time for each of said plurality of client logical partitions to respond to messages from said master partition;

waiting, by said master partition, for an acknowledgement of a receipt of said notification that said physical input/output adapter experienced an error from each of said plurality of client logical partitions;

determining, by said master partition, at least one of whether said acknowledgement has been received from each of said plurality of client logical partitions or whether said maximum response time has expired;

in response to determining that both said acknowledgement has not been received from each of said client logical partitions and that said maximum response time has expired, the master partition rescinding permission of all client logical partitions that have exceeded the maximum response time to access their respective virtual input/output adapter and the master partition attempting to reset the physical input/output adapter;

in response to determining that either said acknowledgement has been received from each of said plurality of client logical partitions or that said maximum response time has expired, the master partition attempting to reset said physical input/output adapter;

determining whether said attempting to reset said physical input/output adapter succeeded;

in response to determining that said attempting to reset said physical input/output adapter succeeded, notifying each of said plurality of client logical partitions, by said master partition, that said attempting to reset said physical input/output adapter succeeded; and in response to determining that said attempting to reset said physical input/output adapter did not succeed, notifying each of said plurality of logical partitions, by said master partition, that said attempting to reset said physical input/output adapter did not succeed.

* * * * *